United States Patent
Baker

(10) Patent No.: US 9,148,988 B2
(45) Date of Patent: Oct. 6, 2015

(54) DEPTH CONTROL SYSTEM

(71) Applicant: PENTA TMR INC., Petrolia (CA)

(72) Inventor: John Baker, Petrolia (CA)

(73) Assignee: PENTA TMR INC., Petrolia, Ontario (CA)

(*) Notice: Subject to any disclaimer, the term of this patent is extended or adjusted under 35 U.S.C. 154(b) by 120 days.

(21) Appl. No.: 13/783,599

(22) Filed: Mar. 4, 2013

(65) Prior Publication Data

US 2013/0175063 A1  Jul. 11, 2013

Related U.S. Application Data

(63) Continuation-in-part of application No. 12/852,187, filed on Aug. 6, 2010, now abandoned.

(60) Provisional application No. 61/231,744, filed on Aug. 6, 2009.

(51) Int. Cl.
*A01B 63/16* (2006.01)
*A01B 73/02* (2006.01)
*A01B 63/22* (2006.01)

(52) U.S. Cl.
CPC .............. *A01B 63/16* (2013.01); *A01B 63/22* (2013.01); *A01B 73/02* (2013.01)

(58) Field of Classification Search
CPC ......... A01B 63/16; A01B 63/22; A01B 73/02
USPC ........... 172/76, 138, 239, 318, 324, 346, 460, 172/468, 471, 472, 485, 650, 659, 668, 675, 172/776
See application file for complete search history.

(56) References Cited

U.S. PATENT DOCUMENTS

| | | | |
|---|---|---|---|
| 2,699,715 A * | 1/1955 | Shelton | 172/708 |
| 3,209,839 A * | 10/1965 | Morkoski et al. | 172/405 |
| 3,643,745 A | 2/1972 | Berlius et al. | |
| 3,700,043 A * | 10/1972 | Sullivan | 172/400 |
| 4,317,489 A * | 3/1982 | Steinbach | 172/400 |
| 4,660,842 A * | 4/1987 | Watt et al. | 280/43.23 |
| 2,622,761 A | 11/1987 | Aron | |
| 5,086,847 A | 2/1992 | Meiners | |
| 5,167,286 A * | 12/1992 | Bossler | 172/414 |
| 5,366,024 A * | 11/1994 | Payne | 172/318 |

(Continued)

OTHER PUBLICATIONS

United States Patent and Trademark Office, Non-final Office Action, U.S. Appl. No. 12/852,187 dated Apr. 25, 2012.

(Continued)

*Primary Examiner* — Jamie L McGowan
(74) *Attorney, Agent, or Firm* — Gowling Lafleur Henderson LLP; Neil Henderson

(57) ABSTRACT

A depth control system for a frame mounted to a movement system is provided. The frame is mounted such that the frame can be raised and lowered in relation to the movement system by a height adjustment mechanism. The depth control system includes a depth control arm connected to the movement system, a height adjustment mechanism, and a mechanical stop. The height adjustment mechanism is configured to engage with the depth control arm to adjust the height of the frame. The mechanical stop is configured to engage with the depth control arm to prevent the frame from moving in at least one direction with respect to the movement system and disengage from the depth control arm when the height of the frame is being adjusted.

18 Claims, 19 Drawing Sheets

(56) References Cited

U.S. PATENT DOCUMENTS

| | | |
|---|---|---|
| 5,409,069 A | 4/1995 | Hake |
| 5,452,768 A * | 9/1995 | Koberlein ................. 172/76 |
| 5,975,215 A * | 11/1999 | Jensen et al. ............... 172/407 |
| 7,540,332 B2 * | 6/2009 | Friggstad et al. ............ 172/482 |
| 7,581,597 B2 | 9/2009 | Neudorf et al. |
| 2,886,116 A1 | 5/2013 | Howard |

OTHER PUBLICATIONS

United States Patent and Trademark Office, Non-final Office Action, U.S. Appl. No. 12/852,187, dated Dec. 4, 2012.

* cited by examiner

DEPTH CONTROL SYSTEM

CROSS REFERENCE TO RELATED APPLICATIONS

This application is a Continuation-in-Part of U.S. application Ser. No. 12/852,187 filed Aug. 6, 2010, which claims priority from U.S. Provisional Application No. 61/231,744 filed Aug. 6, 2009, both of which are hereby incorporated herein by reference.

FIELD

This application generally relates to a depth or height control system for equipment that includes implements to be raised and lowered. More particularly, the present application relates to an improved depth or height control system for farm equipment.

BACKGROUND

Large scale farming involves the use of power-driven assemblies of cultivation equipment to allow for cultivating and planting fields faster, more efficiently, and with less expenditure of resources. In many cases, the equipment, such as tillage equipment, includes a frame or platform that is towed behind a powered vehicle, such as a tractor. These equipment frames can be raised or lowered in relation to supports, typically wheels, in order to bring the tools in contact with the ground or crops at an appropriate height. Maintaining an appropriate height can be an important factor. For example, in planting, seed depth impacts when the plants will germinate and subsequently grow. This can determine when a crop matures and can have an impact on yield or the like.

The raising and lowering of the equipment frame can be handled by hydraulic or similar systems provided on the equipment (here, the term "hydraulics" is intended to include both air and oil types). A disadvantage of using hydraulic systems is the tendency to leak fluid. In these systems, the seals required to separate the pressurized hydraulic fluid from the atmosphere can wear and leaks may occur. Further, when the pressure within the hydraulic system is fluctuating due to differing pressures from the farm implements and the like, additional stresses are placed on the mechanical components of the hydraulic systems, which increase the likelihood of breakdown. If there is a leak or breakdown, the hydraulic system will not be able to maintain or change the height of the frame.

Some conventional systems make use of mechanical stops or the like to maintain height if, for example, the hydraulics fail or are overloaded. However, systems making use of a mechanical stop can be difficult to adjust to a preferred height or depth because they need to be adjusted under a load, whether due to the hydraulics or because the farm implements are in a lowered position or the like. In these systems, the hydraulics typically need to be depressurized before the mechanical stop can be set.

As such, there is need for an improved depth control for height adjustment systems.

SUMMARY

Generally speaking, the embodiments herein relate to a depth or height control for a depth/height adjustment system on a piece of equipment. In particular, the embodiments relate to a depth control system that provides an improved mechanical stop or locking mechanism in relation to a depth setting of a frame of a piece of equipment. The mechanical stop can be adjusted by a predetermined amount, for example, every ½", to set the frame at the desired working depth. The depth control system is configured such that it can be adjusted from the front of the equipment, with ease under no load or resistance when the equipment is raised or in the transport mode. There may not be a need to depressurize the hydraulics or the like.

In one aspect there is provided a depth control system for a frame mounted to a movement system, wherein the frame is mounted such that the frame can be raised and lowered in relation to the movement system by a height adjustment mechanism. The depth control system includes a depth control support attached to the height adjustment mechanism and configured to move with the frame during depth adjustment, a depth control arm extending from the depth control support towards a first end of the frame, a frame guide incorporated to the first end of the frame designed to receive the depth control arm, and a locking mechanism adapted to receive and lock the depth control arm in relation to the frame guide such that the depth control support prevents the frame from moving in at least one direction.

In a particular case, the locking mechanism of the depth control system may have a sleeve designed to abut against the frame guide. The sleeve includes at least one positioning hole that matches a plurality of positioning holes within the depth control arm.

In this case, the locking mechanism may further have a pin designed to fit the at least one positioning hole of the sleeve and the plurality of positioning holes in the depth control arm.

In one particular case, the plurality of positioning holes within the depth control arm may be offset every ½ inch.

In another particular case, the depth control system may include a fine adjustment mechanism. The fine adjustment mechanism may have a clevis and a threaded bolt provided to the connection between the depth control support and the depth control arm.

In some cases, the depth the height adjustment mechanism may have a suspension system.

In some particular cases, the suspension system further may have hydraulics.

In another aspect, there is provided a depth control system for a frame mounted to a wheel frame, wherein the depth control system is mounted between the frame and the wheel frame such that the frame may be lowered in relation to the wheels. The depth control system includes a depth control support and a frame support wherein the depth control support and the frame support are configured to move during depth adjustment a depth control arm extending from the depth control support towards a first end of the frame, the depth control arm includes a plurality of positioning holes on an end, a support arm extending from the frame support towards the first end of the frame, a frame guide incorporated to the first end of the frame designed to receive the depth control arm and the support arm, a sleeve designed to abut against the frame guide, the sleeve includes at least one hole that matches the plurality of positioning holes within the depth control arm, and a pin designed to fit the at least one positioning of the sleeve and the plurality of positioning holes in the depth control arm such that the depth control support prevents the frame from moving in at least one direction.

In a particular case, the plurality of positioning holes within the depth control arm may be offset every ½ inch.

In another particular case, the depth control system may include a fine adjustment mechanism. The fine adjustment mechanism may have a clevis and a threaded bolt provided to the connection between the depth control support and the depth control arm.

In a particular case, the depth control system may be operatively connected to a suspension system. The suspension system may have hydraulics.

In still another aspect, there is provided farm equipment including a movement system, a center frame, and a depth control system mounted between the center frame and the movement system such that the center frame can be raised or lowered in relation to the movement system by a height adjustment mechanism. The depth control system includes a depth control support attached to the height adjustment mechanism and configured to move with the frame during depth adjustment a depth control arm extending from the depth control support towards a first end of the frame a frame guide incorporated to the first end of the frame designed to receive the depth control arm and a locking mechanism adapted to receive and lock the depth control arm in relation to the frame guide such that the depth control support prevents the center frame from moving in at least one direction.

In one case, the farm equipment may have at least one side attachment attached to the center frame. The at least one side attachment includes a side attachment movement system, a side attachment frame and a depth control system mounted between the side attachment frame and the side attachment movement system such that the side attachment frame can be raised or lowered in relation to the side attachment movement system by a height adjustment mechanism at a different depth than the center frame. The depth control system includes a depth control support attached to the height adjustment mechanism and configured to move with the frame during depth adjustment a depth control arm extending from the depth control support towards a first end of the frame a frame guide incorporated to the first end of the frame designed to receive the depth control arm and a locking mechanism adapted to receive and lock the depth control arm in relation to the frame guide such that the depth control support prevents the side attachment frame from moving in at least one direction.

In an aspect, the present disclosure provides a depth control system for a frame mounted to a movement system. The depth control system includes a depth control arm connected to the movement system, a height adjustment mechanism connected to the frame, and a mechanical stop connected to the frame. The height adjustment mechanism is configured to engage with the depth control arm to adjust the height of the frame. The mechanical stop is configured to engage with the depth control arm to prevent the frame from moving in at least one direction with respect to the movement system and disengage from the depth control arm when the height of the frame is being adjusted.

In another aspect, the present disclosure provides farm equipment including a movement system, a center frame, and a depth control system. The depth control system includes a depth control arm connected to the movement system, a height adjustment mechanism connected to the center frame, and a mechanical stop connected to the center frame. The height adjustment mechanism is configured to engage with the depth control arm to adjust the height of the center frame. The mechanical stop is configured to engage with the depth control arm to prevent the center frame from moving in at least one direction with respect to the movement system and disengage from the depth control arm when the height of the center frame is being adjusted.

In an aspect, the height adjustment mechanism is configured to disengage from the depth control arm when the frame is in a locked position. In another aspect, the height adjustment mechanism is configured to disengage from the depth control arm when the center frame is in a locked position.

In an aspect, the mechanical stop comprises a locking mechanism. In a further aspect, the locking mechanism includes a locking shaft, a sleeve, and a pin to lock the position of the locking shaft to the sleeve. In a further aspect, the pin passes through at least one positioning hole in the sleeve and one of a plurality of positioning holes in the locking shaft to lock the position of the locking shaft to the sleeve.

The depth control system includes a transverse member connected to the depth control arm and extending to a second depth control arm connected to the movement system.

In an aspect, the sleeve is connected to the frame and the locking shaft contacts the depth control arm. In an aspect, the sleeve is connected to the center frame and the locking shaft contacts the depth control arm.

In an aspect, the height adjustment mechanism comprises a hydraulic system.

In an aspect, the depth control system includes a fine adjustment mechanism.

In an aspect, the farm equipment includes at least one side attachment attached to the center frame. The at least one side attachment includes a side attachment movement system, a side frame, a side height adjustment mechanism connected to the side frame, and a side mechanical stop connected to the side frame. The side height adjustment mechanism is configured to engage with a side depth control arm to adjust the height of the side frame and disengage from the side depth control arm when the side frame is in a locked position. The side mechanical stop is configured to engage with the side depth control arm to prevent the side frame from moving in at least one direction with respect to the side attachment movement system and disengage from the side depth control arm when the height of the side frame is being adjusted.

In a further aspect, the side frame is operable to be raised or lowered to a different depth than the center frame.

In some cases the depth control system of the center frame and the depth control system of the at least one side attachment may have a fine adjustment mechanism. The fine adjustment mechanism may have a clevis and a threaded bolt provided to the connection between the depth control support and the depth control arm.

BRIEF DESCRIPTION OF THE DRAWINGS

For a better understanding of the embodiments described herein and to show more clearly how they may be carried into effect, reference will now be made, by way of example only, to the accompanying drawings which show example embodiments and in which.

Figure 1:
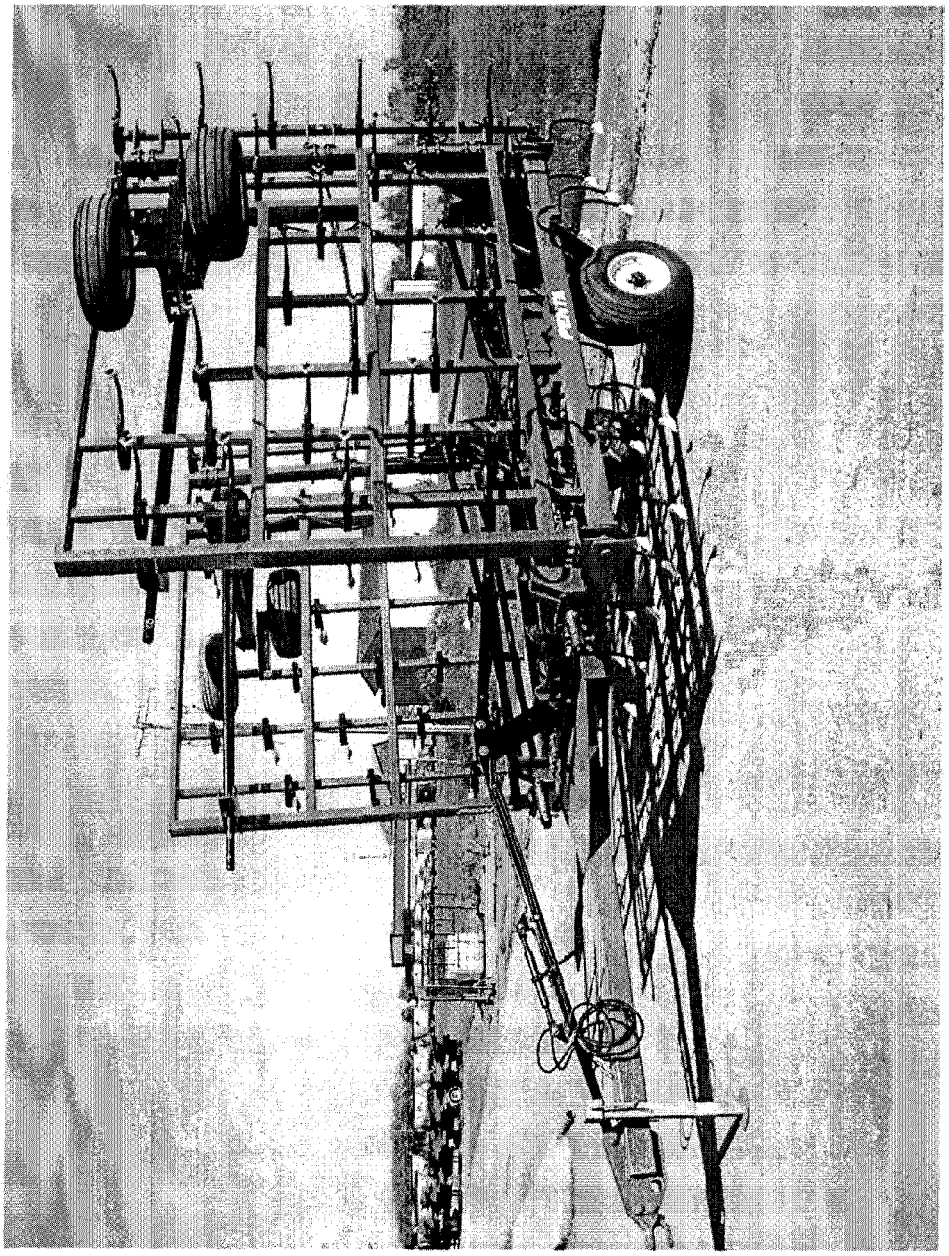
FIG. 1 is a photo showing a piece of farm equipment, in particular, farm equipment for tillage, including an embodiment of the depth control system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

DETAILED DESCRIPTION

In the following description, the embodiments relate to farm equipment used for tillage. It will be understood by one of skill in the art that similar principles may be applied to other equipment in a similar way, and should not be considered limited to farm equipment. The embodiments may be applied to equipment with a frame that is mounted to a movement system where it is desirable for the frame to be raised and lowered in relation to a movement system. Other farm implements that may benefit from this system include cultivator blades, chisel plows, or the like. The farm equipment is typically towed behind a powered vehicle, most often a tractor.

Figure 2:
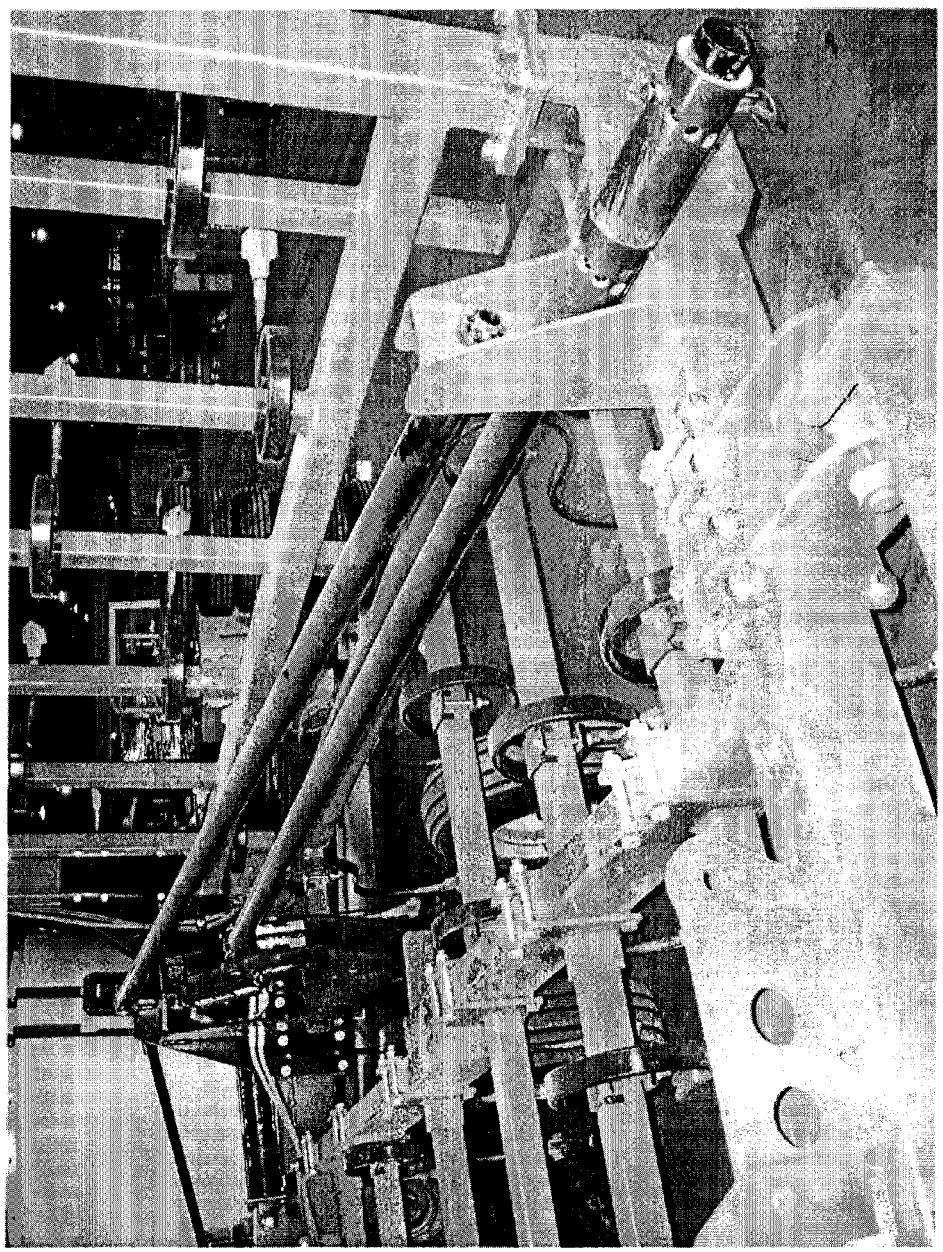
FIG. 2 is a photo showing further detail relating to the depth control system of the farm equipment of FIG. 1.
Figure 3:
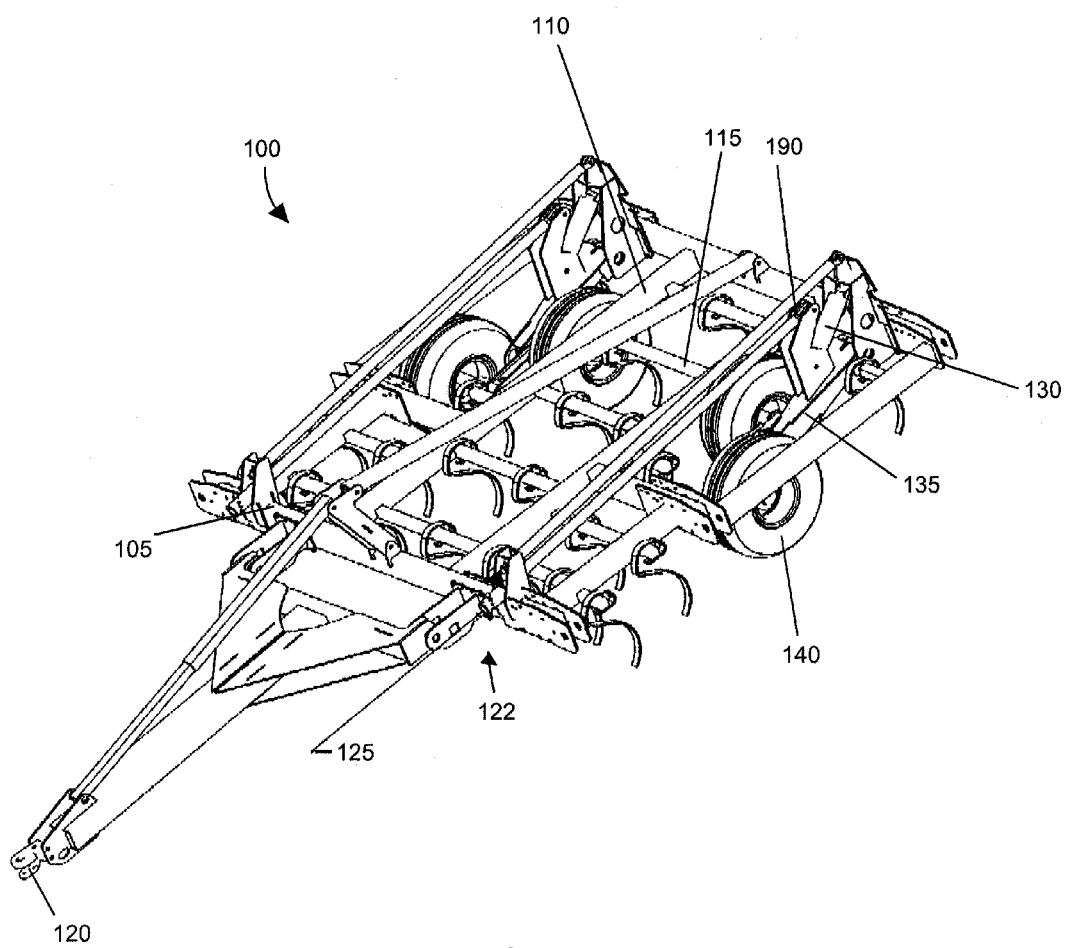
FIG. 3 is a perspective view of another piece of farm equipment including an embodiment of the depth control system.
Figure 4A:
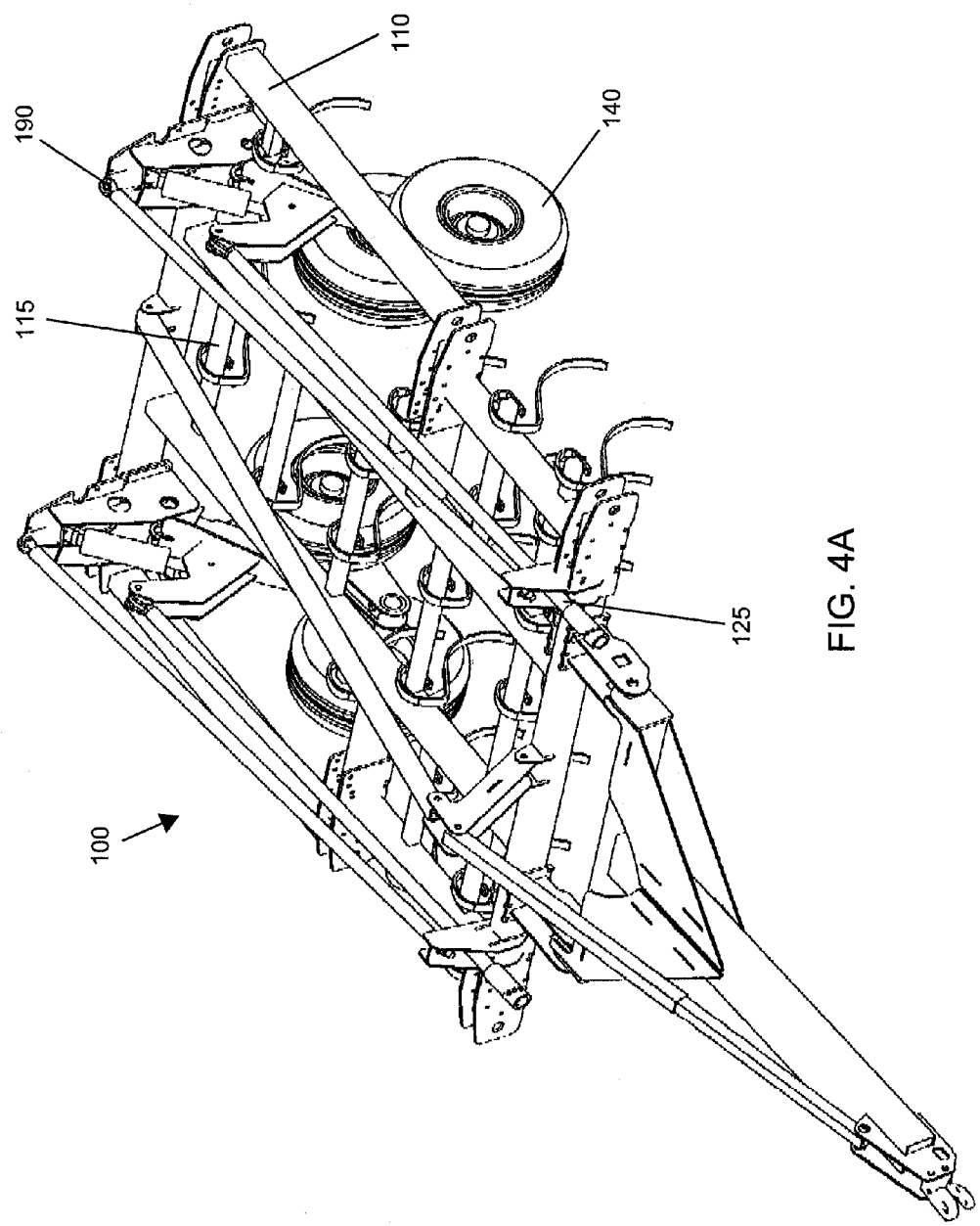
FIG. 4A is a perspective view of the farm equipment of FIG. 3 with a height adjustment system in an up position.
Figure 4B:
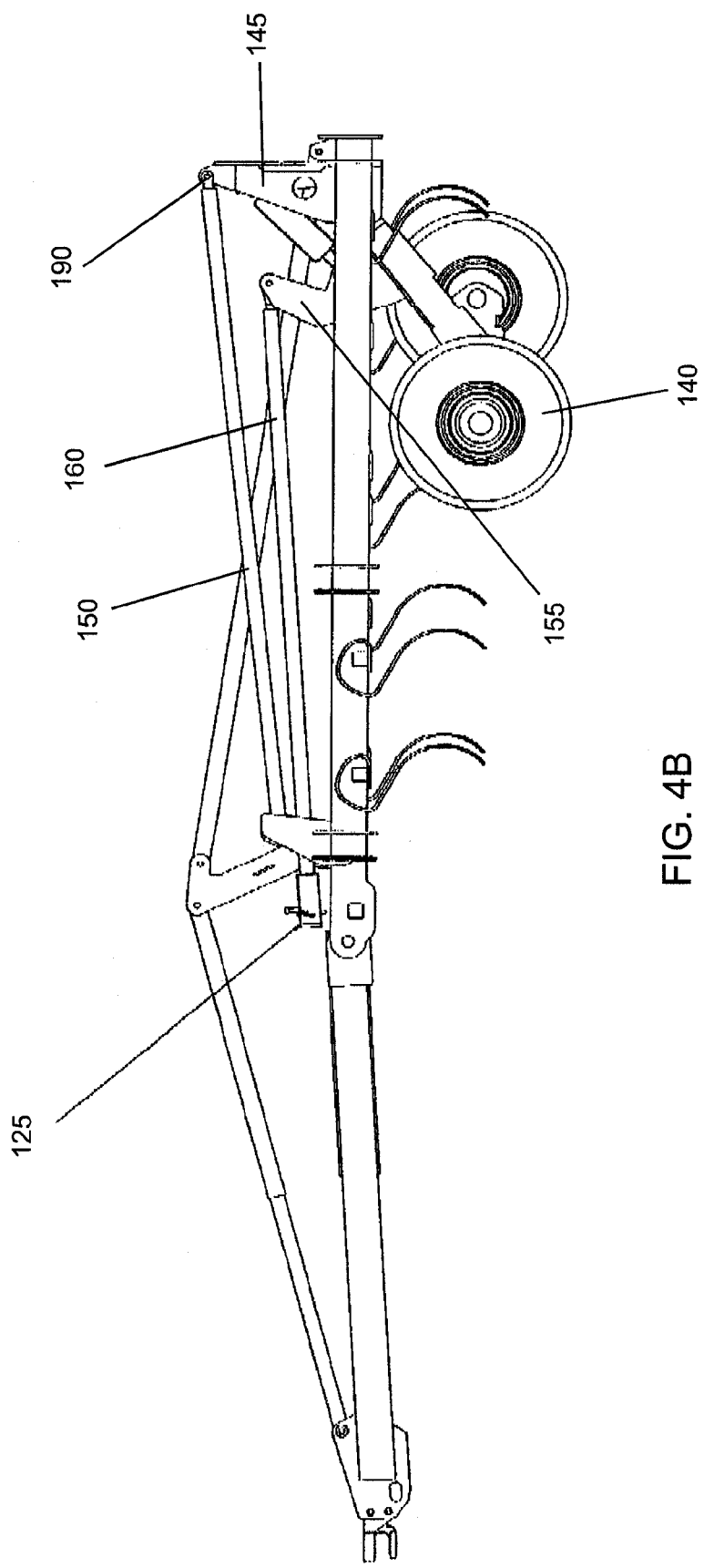
FIG. 4B is a side view of the farm equipment of FIG. 4A.

FIGS. 1 and 2 are photographs showing a piece of farm equipment including an improved depth control system. In this case, the farm equipment is configured for tillage. FIG. 3 is a perspective view of another piece of farm equipment 100. The farm equipment typically includes an equipment frame 105 including a grid of longitudinal structural members 110 and lateral cross-members 115 that define a roughly rectangular or quadrilateral arrangement. Other equipment may take alternate shapes, for example, a more triangular arrangement, depending on the farm equipment in use. Farm implements, such as cultivator discs and chisel plows, may then be placed on the structural members 110 of the equipment frame 105. A hitch 120 may be provided to allow the farm equipment 100 to be attached to a tractor or other powered vehicle (not shown). Other attachments may be used, such as a drawbar. The farm equipment 100 includes a depth control system 122 including a depth control assembly 125 and a height adjustment mechanism 130. In this case, the height adjustment mechanism 130 is a hydraulic suspension system, mounted between the equipment frame 105 and a wheel frame 135. Wheels 140 are provided to the wheel frame 135 and provide ground contact points. The wheels 140 are an example of a movement system but the systems herein may also be used with other movement systems, for example continuous track or caterpillar track systems.

Figure 5A:
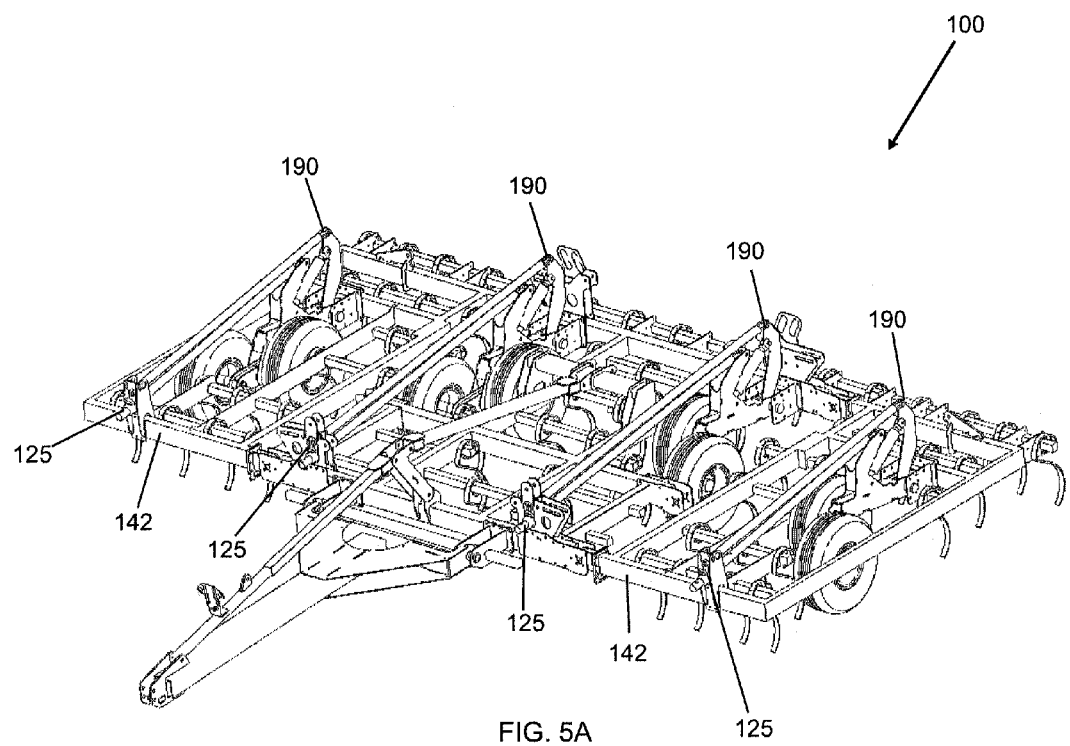
FIG. 5A is a perspective view of the farm equipment of FIG. 3 with a height adjustment system in a down position.
Figure 5B:
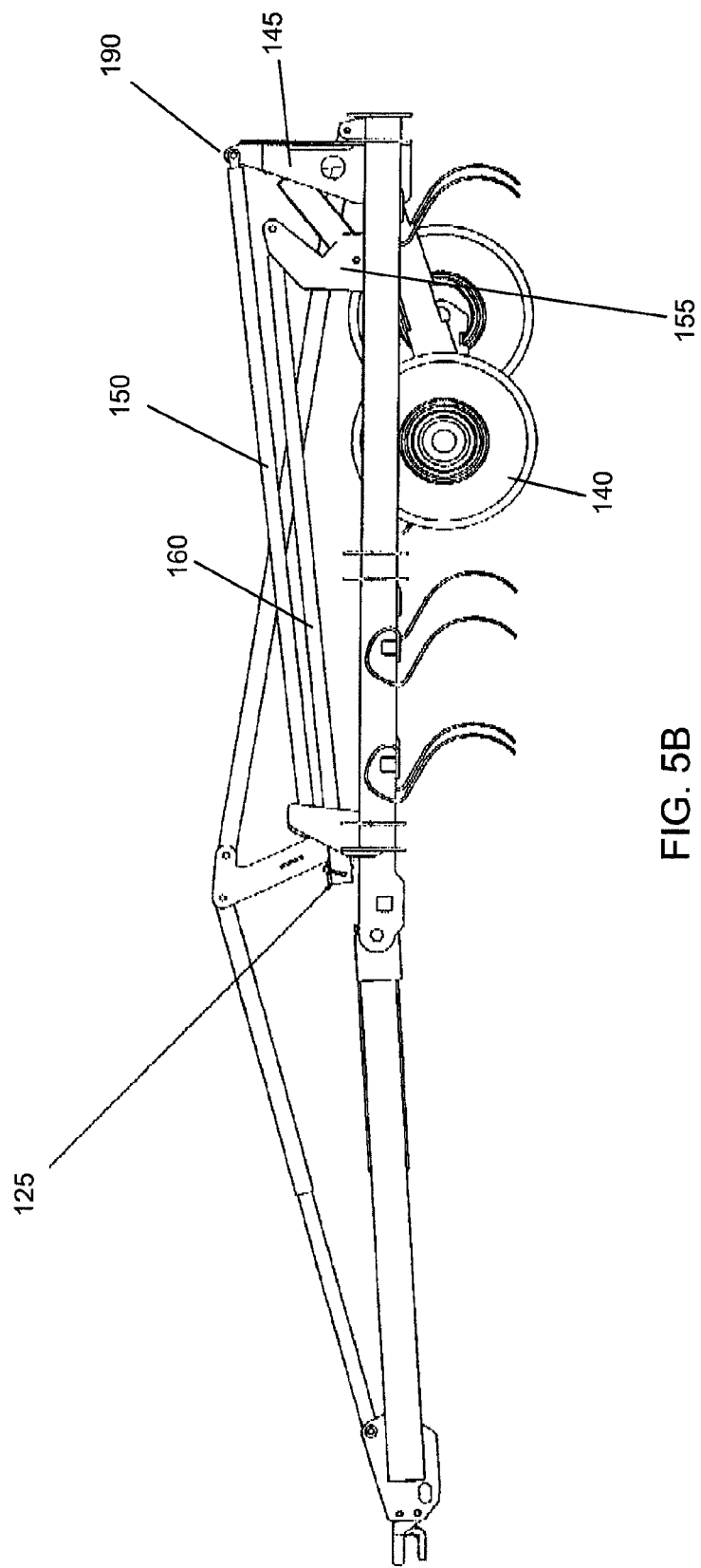
FIG. 5B is a side view of the farm equipment of FIG. 5A.

FIGS. 4A, 4B and 5A, 5B show perspective and side views of the farm equipment 100 in up and down positions, respectively. Note that FIG. 5A shows an embodiment in which the equipment includes "wings" as shown in FIG. 1 and described further below. As shown in these figures, the frame 105 can be raised as in FIGS. 4A and 4B and lowered as in FIGS. 5A and 5B with respect to the wheel frame 135 of the equipment 100. In FIG. 5A, the farm equipment includes "wings", which are side attachments 142, which may increase the area covered by the farm equipment. The use of side attachments 142, and how they are attached to the farm equipment frame 105 is generally known in the art. The side attachments 142 may also be adapted to include a depth control assembly 122 and a height adjustment mechanism 130 per each side attachment 142. As each depth control assembly 125 and height adjustment mechanism 130 may be adjusted independently, the side attachments 142 may be at a different depth than each other and at a different depth than the center frame of the farm equipment 100.

Figure 6A:
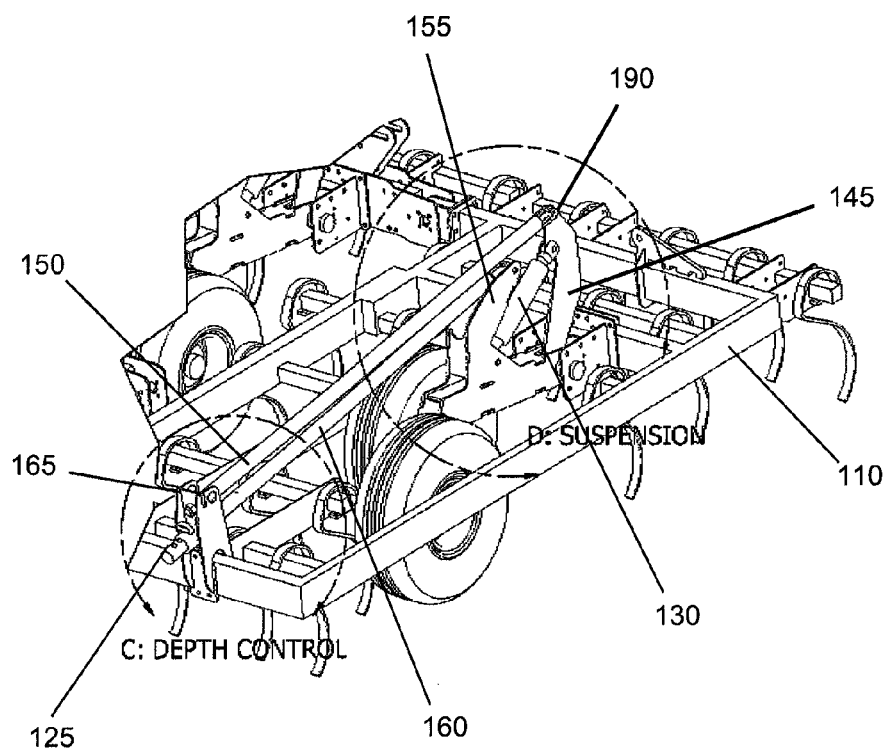
FIG. 6A shows a simplified view of the farm equipment of FIG. 3 showing details of the height adjustment system in an up position.
Figure 7A:
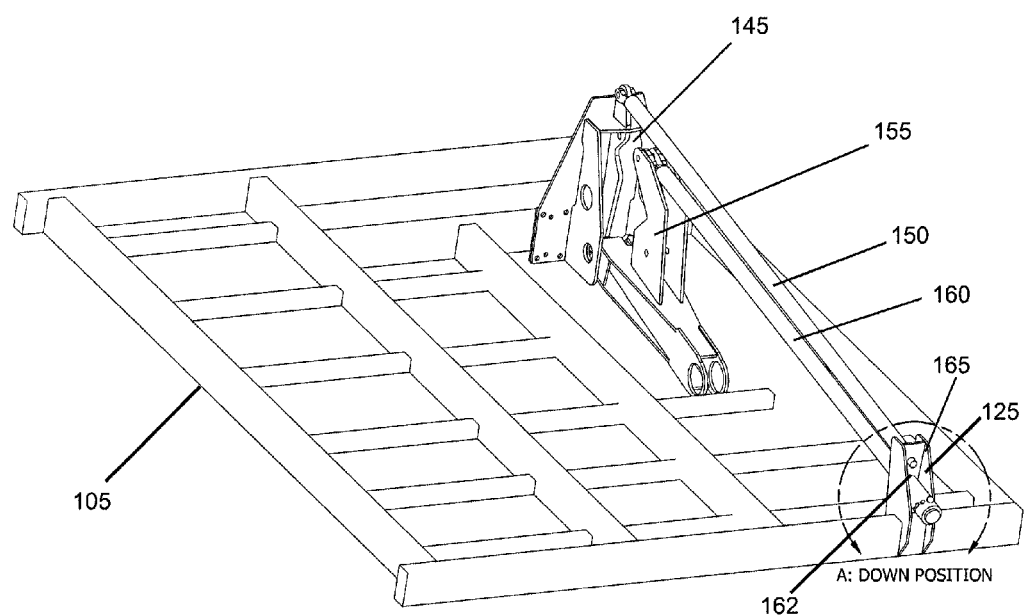
FIG. 7A shows a simplified view of the farm equipment of FIG. 3 showing details of the height adjustment system in a down position.

FIGS. 6A and 7A show additional detail of the equipment frame 105 and height adjustment mechanism 130 in up and down positions, respectively, with FIG. 7A providing a simplified view of the frame 105. The height adjustment mechanism 130 drives a frame support 145 that is positioned between the equipment frame 105 and the wheel frame 135 to raise or lower the equipment frame 105 in relation to the wheel frame 135 by acting in conjunction with a support arm 150. In this embodiment of the depth control system 125, a depth control support 155 is provided to the wheel frame 135 and a depth control arm 160 is provided to the depth control support 155. The depth control arm 160 extends from the depth control support to a frame guide 165, which, in this embodiment, is placed at the front of the frame 105. The frame guide 165 may be provided in the frame 105 itself or may be provided as a separate element welded, bolted or otherwise provided to the frame 105.

The depth control arm 160 extends through an aperture 162 incorporated within the frame guide 165. The depth control arm 160 is provided with a locking mechanism to lock the depth control arm 160 in relation to the frame guide 165 to prevent movement in at least one direction. In this example, the locking mechanism includes one or more positioning holes 170 on at least a portion of the depth control arm 160 that extends through the frame guide 165. The locking mechanism includes a sleeve 175 that is provided to fit over the depth control arm 160. The sleeve 175 is larger than the aperture 162 in the frame guide 165 and includes one or more positioning holes 172 that match with the positioning holes 170 on the depth control arm 160 such that the sleeve 175 can be placed at predetermined positions along the depth control arm 160 by use of a pin 180 or the like that passes through the positioning holes 172 of the sleeve 175 and the positioning holes 170 depth control arm 160. The at least one positioning hole 172 in the sleeve 175 is configured to match the positioning holes 170 in the depth control arm 160 by having a similar diameter, in order for the pin 180 (a component of the locking mechanism) to fit through the positioning holes in both the sleeve 175 and the depth control arm 160. The positioning holes 170 of the depth control arm 160 may be spaced at, for example, approximately ½" intervals although larger or smaller intervals may be preferred depending on the farm implement being used and the variations of depth required. It will be understood that either of the sleeve 175 or the depth control arm 160 may have a plurality of holes to allow the sleeve 175 to be positioned at the appropriate location for a desired depth setting.

A secondary frame guide (not shown) may be attached to the frame 105 to enclose the sleeve 175 between the frame guide 165 and secondary frame guide. The secondary frame guide would also include an aperture through which the depth control arm 160 may extend. A secondary sleeve (not shown) similar to sleeve 175 could then be used to lock the depth control arm 160 in place in relation to the secondary frame guide to control movement of the depth control arm 160 in a second direction.

Figure 6B:
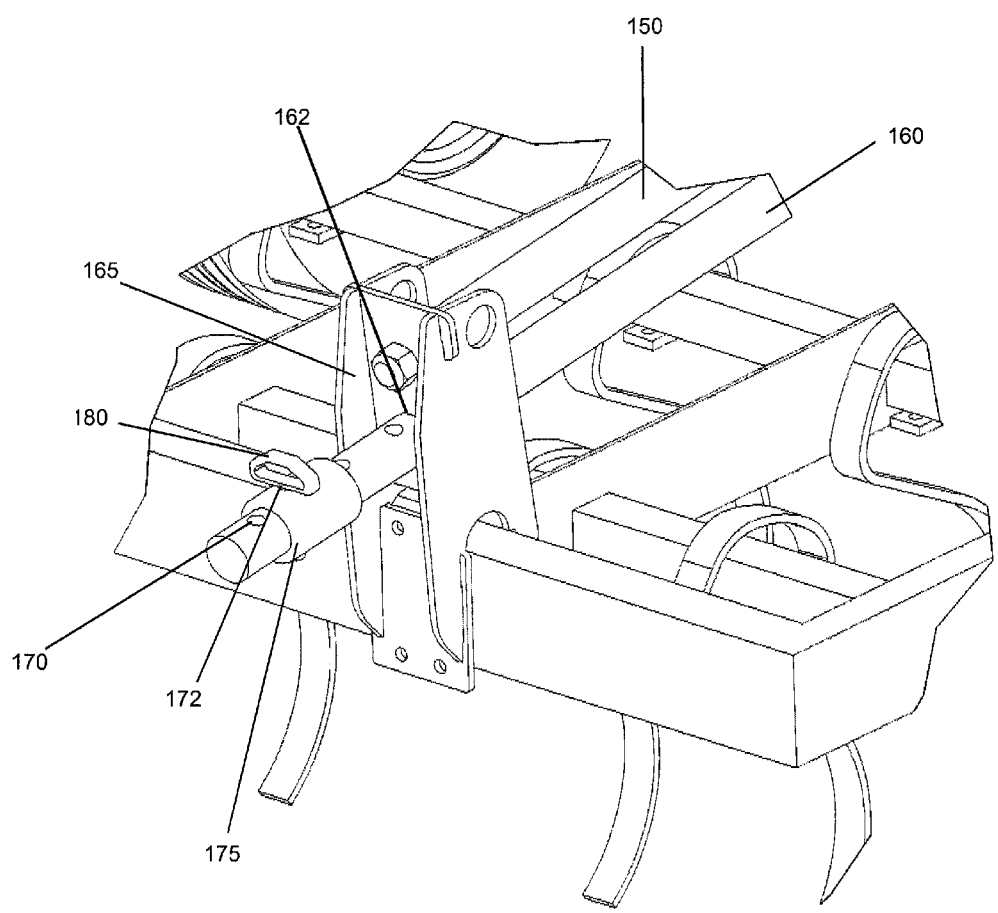
FIG. 6B shows a detailed view of the height adjustment system of FIG. 6A.
Figure 7B:
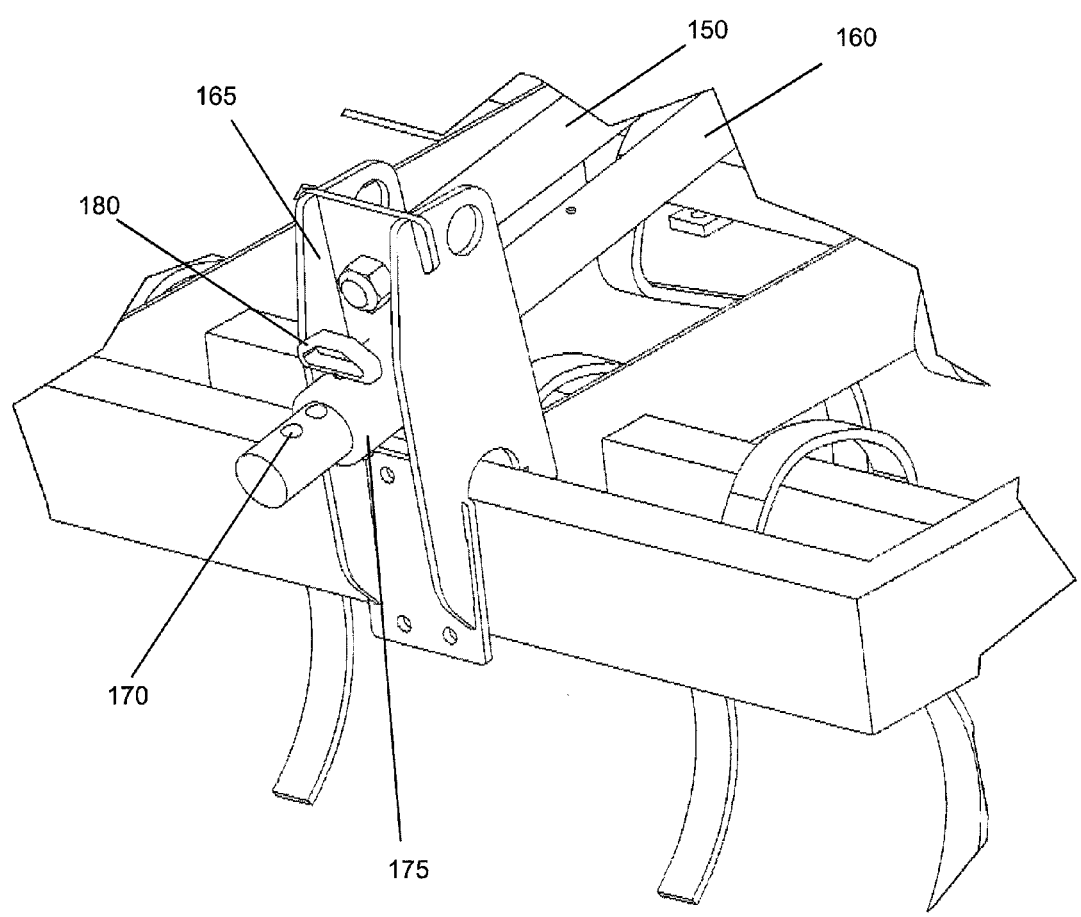
FIG. 7B shows a detailed view of the height adjustment system of FIG. 7A.

FIGS. 6B and 7B show additional detail of the depth control arm 160 and sleeve 175 in up and down positions, respectively. As shown in FIG. 7B, when the equipment frame 105 is lowered, the sleeve 175 will abut the frame guide 165 because it is larger than the aperture in the frame guide 165 and, because of the connection with the depth control arm 160, will not allow the frame 105 to move any lower in relation to the wheels, than the predetermined height set by the sleeve 175. This is intended to be the case even if the hydraulics were to fail. As shown in FIG. 7A, when the frame 105 is raised, the sleeve 175 can be easily moved on the depth control arm 160 to change or set the height/depth without having to depressurize the hydraulic system 130. As such, it is possible to set the depth control assembly 125 using a locking mechanism, such as a sleeve, in a situation where the depth control assembly 125 is not under load and the user can easily and efficiently change the setting.

Figure 8:
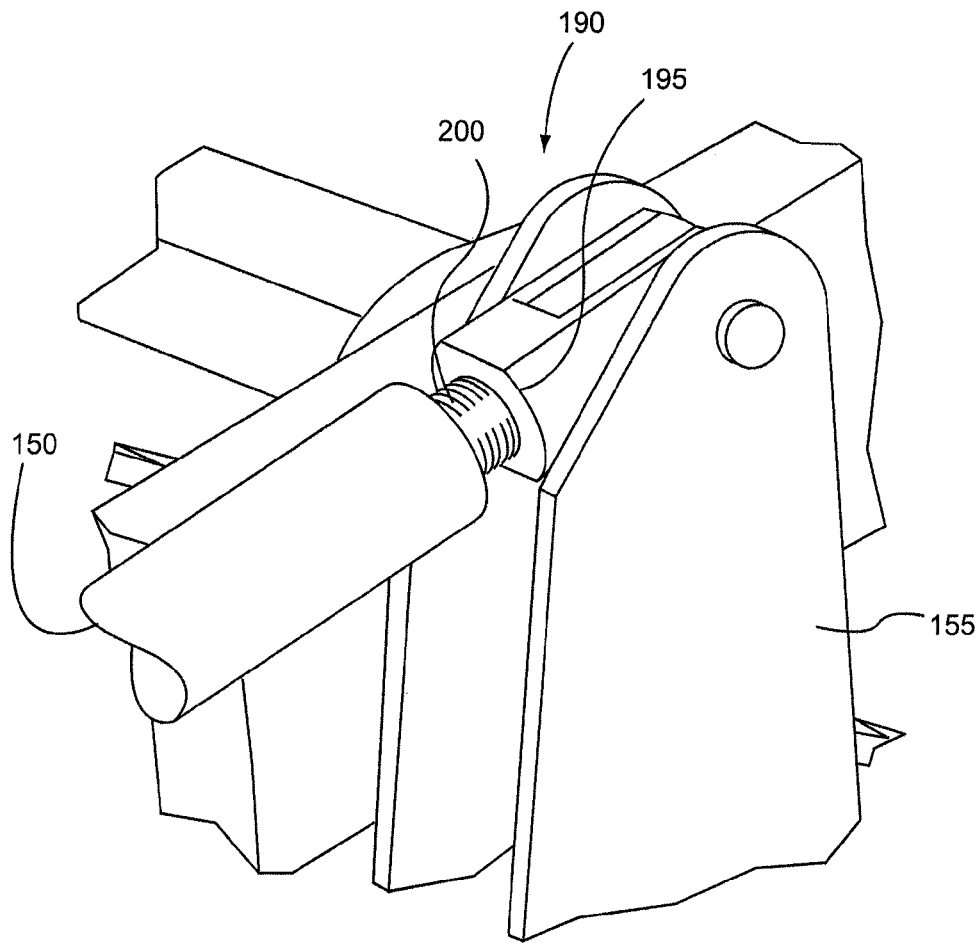
FIG. 8 is a detailed illustration of a fine adjustment mechanism for the farm equipment of FIG. 3.

In some cases, there may also be a fine adjustment mechanism 190 that will normally be set before the use of the farm equipment 100. In the embodiment of FIG. 3, the fine adjustment mechanism is at the depth control support 155 where the depth control arm 160 is connected or at the frame support 145 where the support arm 150 is connected. FIG. 8 shows additional detail of this embodiment of the fine adjustment mechanism 190. The fine adjustment mechanism includes a clevis 195 and a threaded bolt 200 provided where the depth control arm 160 connects to the depth control support 155. The depth control arm 160 can be adjusted along the threaded bolt 200 to allow for fine adjustment of the eventual positioning of the sleeve and positioning holes for the depth control assembly 125.

Figure 9:
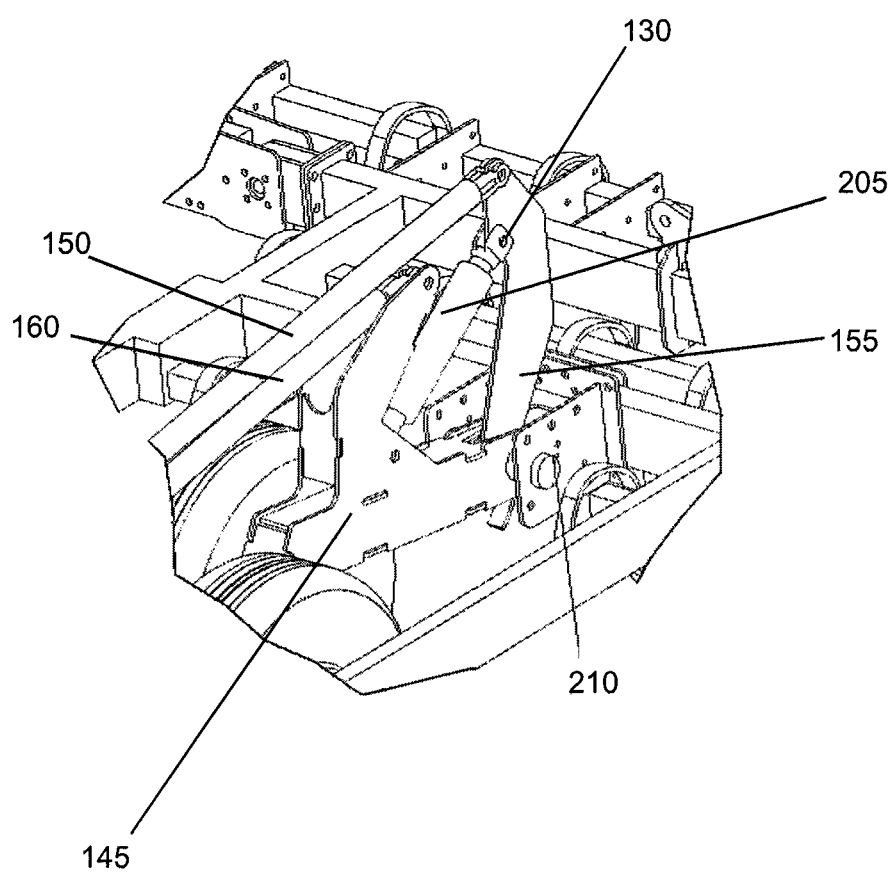
FIG. 9 is a detailed illustration of the suspension of the farm equipment according to one embodiment.

FIG. 9 shows additional detail of the height adjustment system 130. The suspension system 130 includes a hydraulic cylinder 205 that connects at one end to the depth control support 155 or wheel frame 135 and at the other end to the frame support 145. When the frame 105 is to be raised or lowered, the hydraulic cylinder 205 causes the frame support 145 to pivot around a suspension pivot point 210 connected to the frame 105 and cause the frame 105 to raise or lower in relation to the wheels 140. In this process, the depth control support 145 moves such that, as the frame 105 is raised, the depth control arm 160 slides through the frame guide 165 and the sleeve 175 is adjustable. As the frame 105 is lowered, the depth control arm 160 slides through the frame guide 165 until the sleeve 175 abuts the frame guide 165 and serves to prevent the frame 105 from lowering any further and locks the depth of the frame 105. It is intended that this locking will prevent the action of the farm implements from pulling the frame 105 lower and protect the hydraulic cylinder 205 from excess forces.

In the embodiment of the farm equipment having "wings", as each of the center part of the frame and the side attachments may have their own depth control assemblies 125 and suspension system 130, that may be operated individually and independently to create different depth levels as required.

Figure 10:
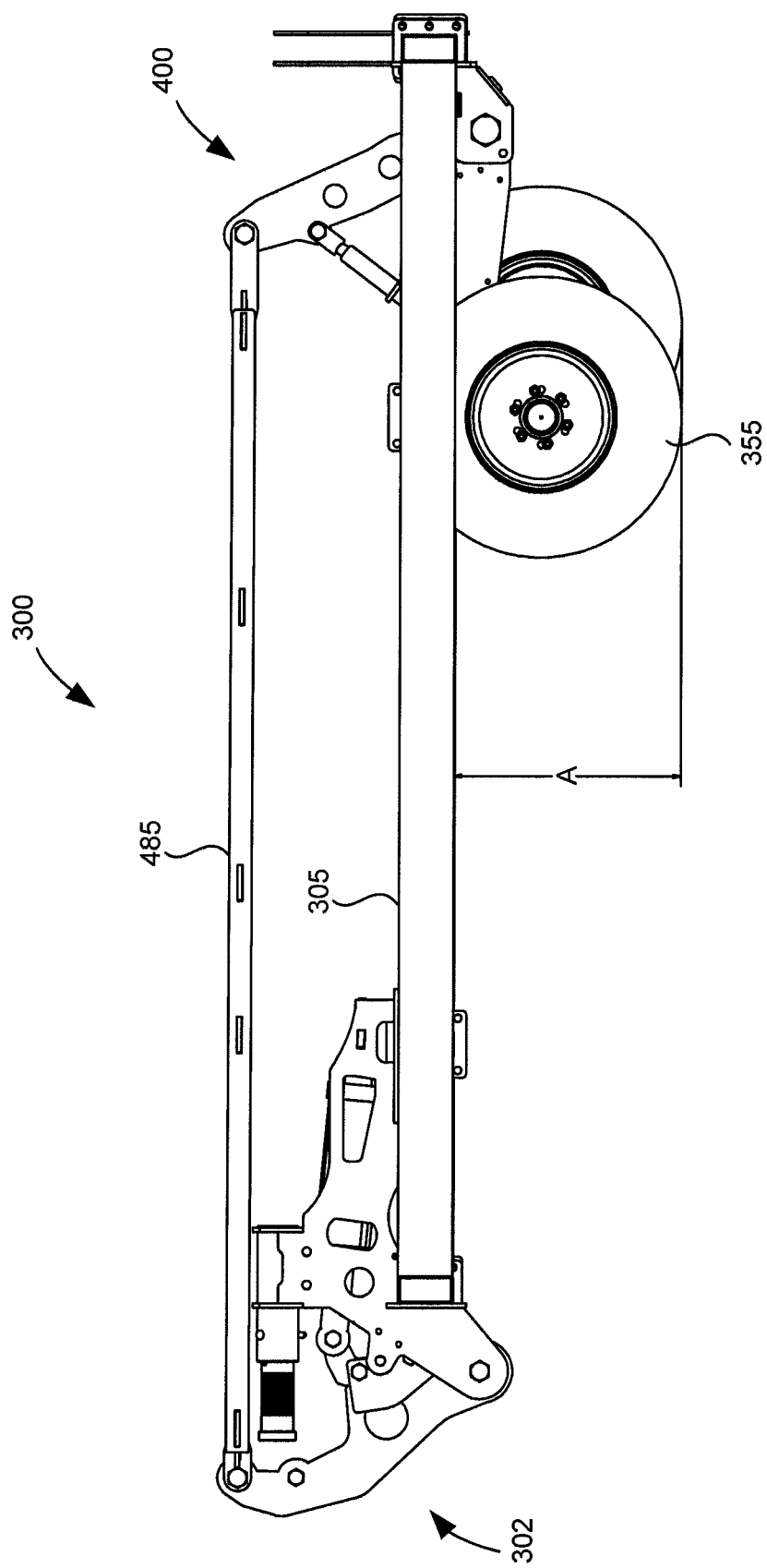
FIG. 10 is a side view of a farm equipment including a further embodiment of the depth control system.
Figure 11:
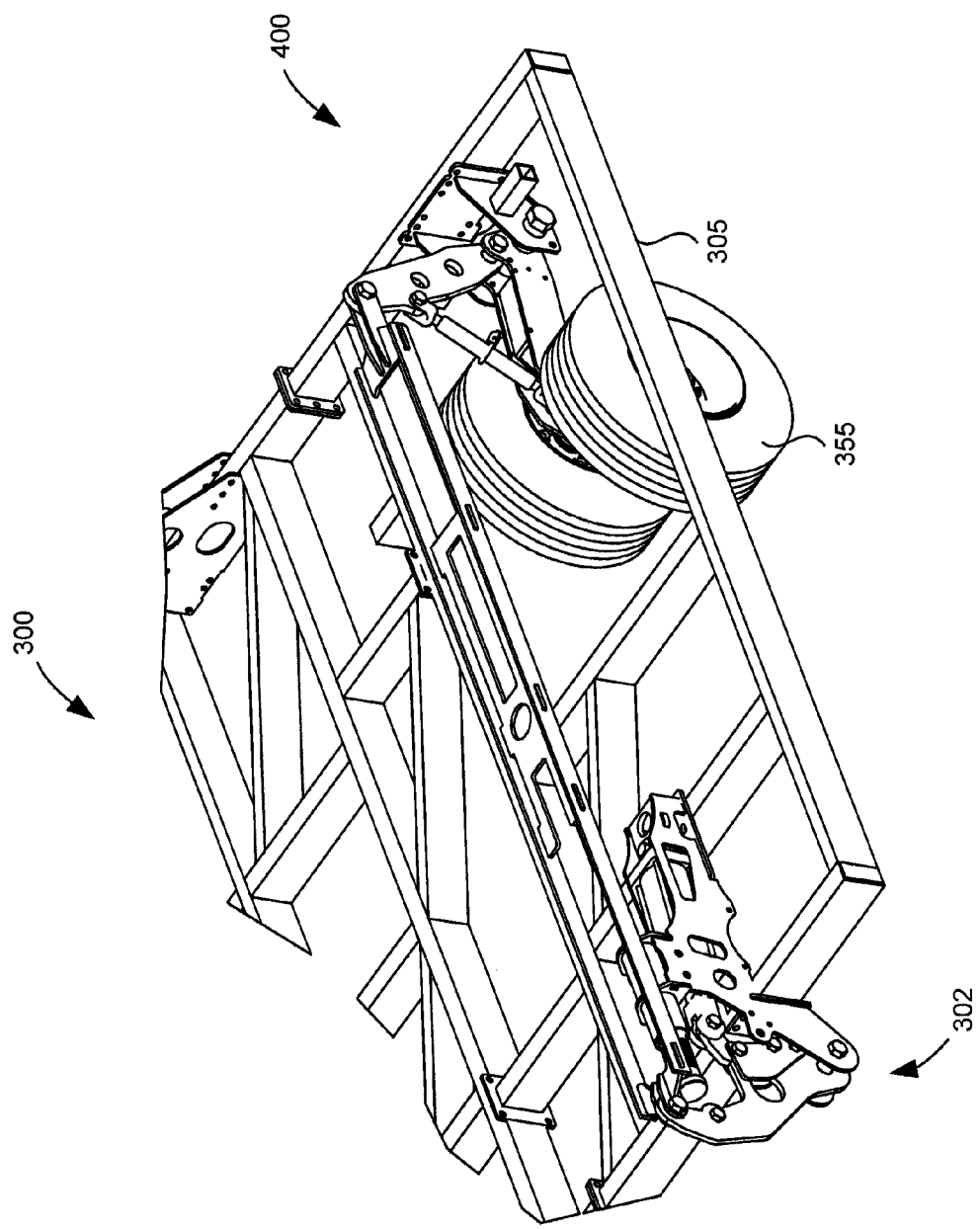
FIG. 11 is a perspective view of the farm equipment of FIG. 10.

FIGS. 10 and 11 illustrate side and perspective views, respectively, of a depth control system 300 in accordance with a further embodiment. The depth control system 300 includes a front depth control assembly 302 and a rear depth control assembly 400. A frame 305 is supported by a plurality of wheels 355. The frame 305 is able to move vertically (e.g., along line A) relative to the ground based on the operation of the depth control system 300. The front depth control assembly 302 adjusts the position of the wheels 355 via the rear depth control assembly 400.

Figure 12:
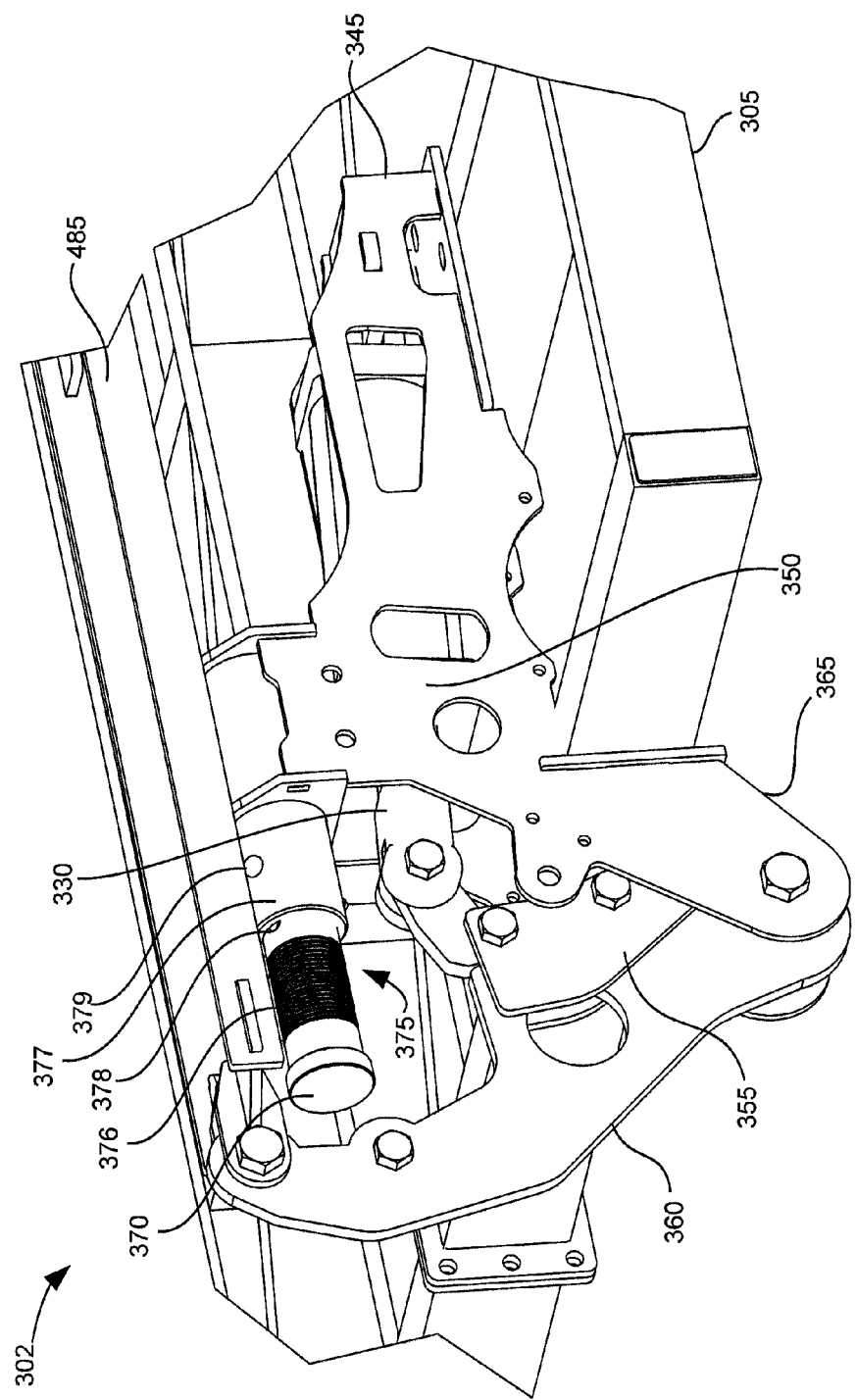
FIG. 12 is a detailed view of the depth control system of FIG. 10.
Figure 13:
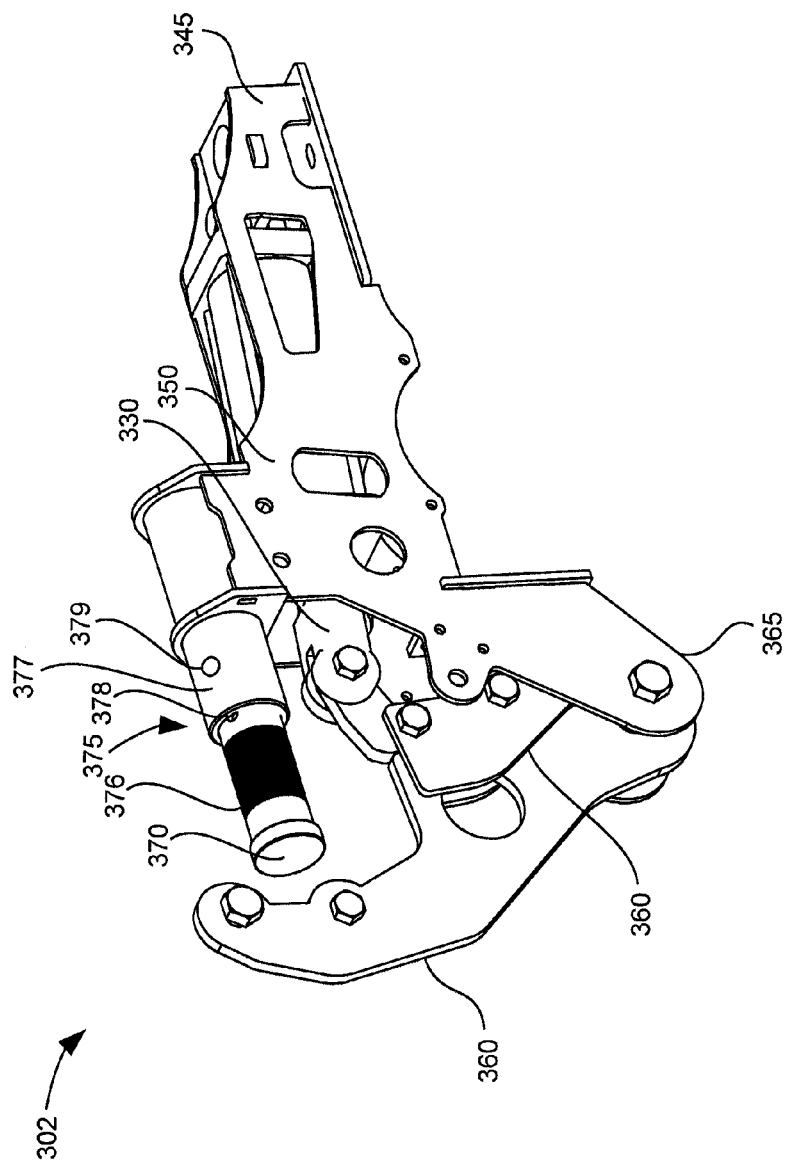
FIG. 13 is an isolated detailed view of the depth control system of FIG. 10.

FIGS. 12 and 13 illustrate detailed and isolated views, respectively, of the front depth control assembly 302, in accordance with an embodiment. In this case, the depth control assembly 302 includes a height adjustment mechanism 330 such as a hydraulic cylinder. The height adjustment mechanism 330 is provided to the frame 305 via a frame support 345. The height adjustment mechanism 330 extends to contact and rotate a depth control arm 360. The depth control arm 360 when rotated, raises or lowers the frame 305 with respect to the wheels 335. A depth control support 355 guides the depth control arm 360 to be in contact with the height adjustment mechanism 330. The depth control arm 360 is provided to the frame 305 via a frame guide 365.

A mechanical stop 370 is adjustably moved into contact with and out of contact with the depth control arm 360. The mechanical stop 370 stops the position of the depth control arm 360 in relation to the frame guide 365 to prevent movement in at least one direction. In this example, the mechanical stop 370 includes a locking mechanism 375 to lock the mechanical stop 370 in contact with at least a portion of the depth control arm 360. In an embodiment, the locking mechanism 375 includes a locking shaft 376 received in a mating sleeve 377. The locking shaft 376 has a set of positioning holes 378 and the sleeve 377 has at least one matching positioning hole 379. A removable pin 379 passes through the positioning hole 378 in the sleeve 377 and one of the set of positioning holes 378 of the locking shaft 376 to lock the position of the mechanical stop 370. The sleeve 377 is provided to the frame 305 via a support arm 350. As shown in FIGS. 12 and 13, the frame guide 365, the support arm 350, and the frame support 345 may be integrally formed.

When the frame 305 is to be raised or lowered by the height adjustment mechanism 330, the mechanical stop 370 is not in contact or engaged with the depth control arm 360. This advantageously reduces impact on the mechanical stop 370 during adjustment, as there is no load on the mechanical stop 370 during the raising and lowering of the frame 305. The absence of load on the mechanical stop 370 during adjustment advantageously reduces impact on the mechanical stop 370 and locking mechanism 375 and simplifies the raising and lowering of the frame 305 for an operator.

Figure 14:
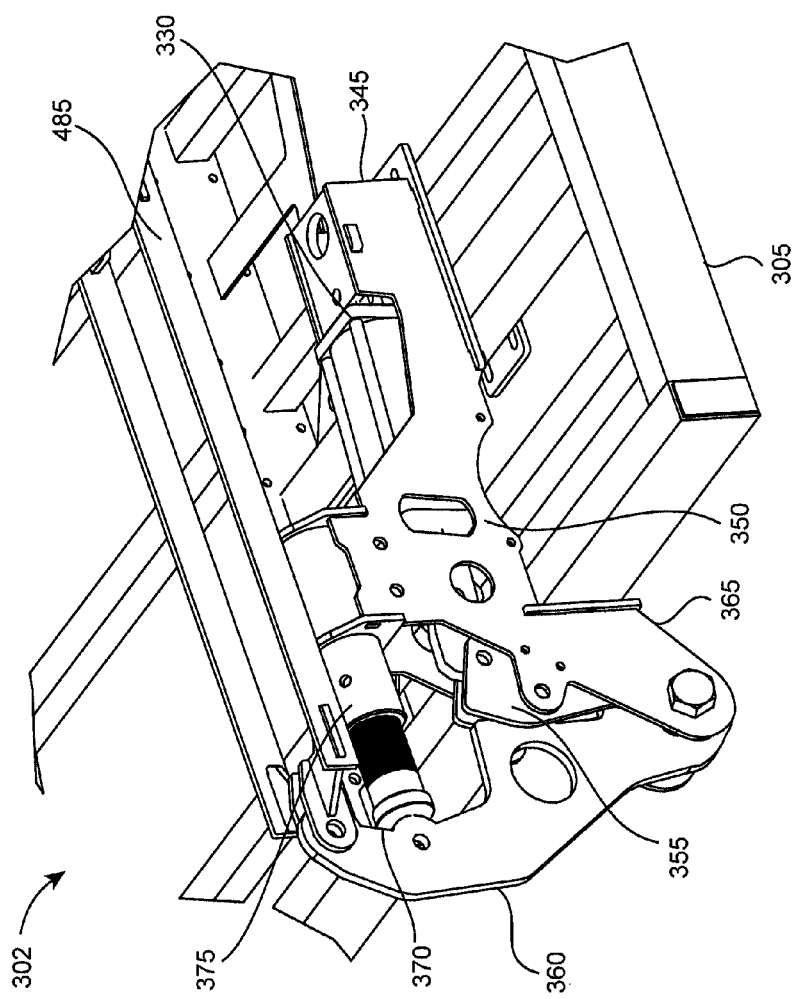
FIG. 14 is a detailed view of the depth control system of FIG. 10 showing a height adjustment mechanism retracted.

FIG. 14 illustrates the front depth control assembly 302 where the mechanical stop 370 is locked in place. In this position, the depth control arm 360 is resting against the mechanical stop 370, such that the load of the frame 305 is resting on the mechanical stop 370. It is then possible to advantageously move the height adjustment mechanism 330 from contacting the depth control arm 360 and retract and re-phase the height adjustment mechanism 330. The depth control arm 360 rests on the mechanical stop 370 and the frame 305 does not depend on the hydraulic system of the height adjustment mechanism 330 to keep the frame 305 at that height.

The depth control system 300 therefor may provide, during adjustment, the engagement of the height adjustment mechanism 330 and complete disengagement of the mechanical stop 370 from contacting the depth control arm 360. Further, the depth control system 300 may provide, when the height is not being adjusted, the complete disengagement of the height adjustment mechanism 330 from contacting the depth control arm 360 and the engagement of the mechanical stop 370 with the depth control arm 360. The reliance on one of the height adjustment mechanism 330 or the mechanical stop 370, but not both, in these positions, provides for reduced stress on the depth control system 300 as the disengaged systems are not subject to the load of the frame 305.

The depth control system 300 may also include a transverse member 485. The transverse member 485 connects (e.g. pivotably) at a first end to the depth control arm 360 and at a rear end to a rear depth control arm 460 on the rear depth control assembly 400.

Figure 15:
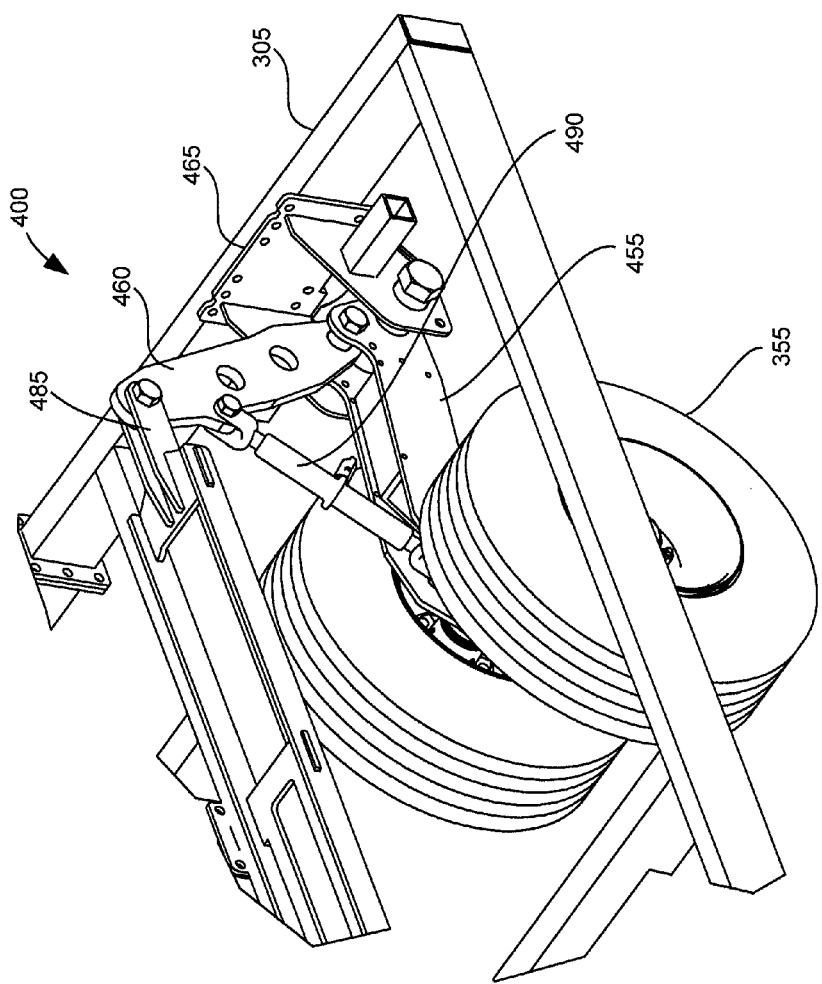
FIG. 15 is a detailed view of a rear assembly of the depth control system of FIG. 10.

FIG. 15 illustrates the rear depth control assembly 400. The rear depth control arm 460 adjusts the position of the movement system 355 (such as a wheel frame 455). The rear depth control arm 460 is connected to the frame 305 by a rear frame guide 465. The rear depth control assembly 400 has a suspension member 490 to provide suspension to the wheel frame 455 and the wheels 355. The rear depth control assembly 400 is engaged with the height adjustment mechanism 330 and the mechanical stop 370 via the transverse member 485 for controlling the height of the frame 305 at both front and rear. As shown in FIGS. 10 and 11, the transverse member 485 extends along the frame 305 to the rear depth control arm 460.

In an alternative embodiment (not shown), the transverse member 485 may extend laterally along the frame 305 to a further depth control system located adjacent to the depth control arm 360.

In an alternative embodiment, a front movement system (not shown) is provided to the depth control arm 360. In this embodiment, the depth control arm 360 directly adjusts the height of the front movement system in replace of or in addition to the rear depth control assembly 400.

In certain embodiments, the subject matter of the depth control system 300 may be combined with certain features of the systems described with reference to FIGS. 1-9.

It will be understood that other arrangements and embodiments will be apparent to those skilled in the art based on the disclosure of the above embodiments. Further, various modifications can be made to the exemplary embodiments described and illustrated herein, without departing from the general scope of the application.

What is claimed is:

1. Farm equipment comprising:
a frame;
a wheel assembly for supporting the frame; and
a depth control system for adjusting the height of the frame in relation to the wheel assembly, the depth control system comprising:
a depth control arm pivotally connected to the frame and connected to the wheel assembly;
a hydraulic height adjustment mechanism configured to drive the depth control arm to raise or lower the frame in relation to the wheel assembly; and
a locking mechanism configured to engage with the depth control arm such that the height of the frame in relation to the wheel assembly remains fixed after the frame is raised or lowered in relation to the wheel assembly and also allow the hydraulic height adjustment mechanism to rephase.

2. A depth control system for a frame mounted to a movement system, the depth control system comprising:
a front depth control assembly provided at a front of the frame comprising:
a first depth control arm pivotally connected to the frame;
a height adjustment mechanism connected to the frame, the height adjustment mechanism configured to engage with the first depth control arm to rotate the first depth control arm with respect to the frame; and
a mechanical stop connected to the frame and adjustable to:
engage with the first depth control arm to prevent rotation of the first depth control arm with respect to the frame and allow disengagement of the height adjustment mechanism such that the height adjustment mechanism can rephase; and
disengage from the depth control arm when the height of the frame is being adjusted; and
a second depth control assembly provided proximate the movement system comprising:
a second depth control arm pivotally connected to the frame and connected to the movement system,
wherein the first depth control arm and the second depth control arm are connected by a transverse member and rotation of the first depth control arm causes rotation of the second depth control arm via the transverse member to adjust the height of the frame with respect to the movement system.

3. The depth control system of claim 2 wherein the mechanical stop comprises a locking mechanism.

4. The depth control system of claim 3 wherein the locking mechanism comprises:
a locking shaft;
a sleeve; and
a pin to lock the position of the locking shaft to the sleeve.

5. The depth control system of claim 4, wherein the sleeve is connected to the frame and the locking shaft contacts the depth control arm.

6. The depth control system of claim 4, wherein the pin passes through at least one positioning hole in the sleeve and one of a plurality of positioning holes in the locking shaft to lock the position of the locking shaft to the sleeve.

7. The depth control system of claim 2, wherein the height adjustment mechanism comprises a hydraulic system.

8. The depth control system of claim 2 further comprising a fine adjustment mechanism for the locking mechanism.

9. The depth control system of claim 2, wherein the second depth control arm is connected to the movement system via a suspension member.

10. Farm equipment comprising:
a movement system;
a center frame; and
a depth control system comprising:
a first depth control assembly provided at a front of the center frame comprising:
a first depth control arm pivotally connected to the center frame;

a height adjustment mechanism connected to the center frame, the height adjustment mechanism configured to engage with the first depth control arm to rotate the first depth control arm with respect to the center frame; and a mechanical stop connected to the center frame and adjustable to:
engage with the first depth control arm to prevent rotation of the first depth control arm with respect to the center frame and allow disengagement of the height adjustment mechanism such that the height adjustment mechanism can rephase; and
disengage from the depth control arm when the height of the center frame is being adjusted; and a second depth control assembly provided proximate the movement system comprising:
a second depth control arm pivotally connected to the center frame and pivotally connected to the movement system, wherein the first depth control arm and the second depth control arm are connected by a transverse member and rotation of the first depth control arm causes rotation of the second depth control arm via the transverse member to adjust the height of the frame with respect to the movement system.

11. The farm equipment of claim 10 wherein the mechanical stop comprises a locking mechanism.

12. The farm equipment of claim 11 wherein the locking mechanism comprises:
a locking shaft;
a sleeve; and
a pin to lock the position of the locking shaft to the sleeve.

13. The farm equipment of claim 12, wherein the sleeve is connected to the center frame and the locking shaft contacts the depth control arm.

14. The farm equipment of claim 12, wherein the pin passes through at least one positioning hole in the sleeve and one of a plurality of positioning holes in the locking shaft to lock the position of the locking shaft to the sleeve.

15. The farm equipment of claim 10, wherein the height adjustment mechanism comprises a hydraulic system.

16. The farm equipment of claim 10, wherein the depth control system further comprises a fine adjustment mechanism for the locking mechanism.

17. The farm equipment of claim 10, further comprising:
at least one side attachment attached to the center frame wherein the at least one side attachment comprises:
a depth control system substantially similar to that of the center frame.

18. The farm equipment of claim 10, wherein the second depth control arm is connected to the movement system via a suspension member.

* * * * *